(12) United States Patent
Andreis et al.

(10) Patent No.: US 12,527,431 B2
(45) Date of Patent: Jan. 20, 2026

(54) FRYER

(71) Applicant: FLUID-O-TECH S.R.L., Milan (IT)

(72) Inventors: Diego Andreis, Milan (IT); Stefano Copelli, Milan (IT); Roberto Zuppi, Milan (IT)

(73) Assignee: FLUID-O-TECH S.R.L., Corsico (IT)

( * ) Notice: Subject to any disclaimer, the term of this patent is extended or adjusted under 35 U.S.C. 154(b) by 869 days.

(21) Appl. No.: 17/835,285

(22) Filed: Jun. 8, 2022

(65) Prior Publication Data

US 2022/0395140 A1    Dec. 15, 2022

(30) Foreign Application Priority Data

Jun. 9, 2021   (IT) .......................... 102021000015029

(51) Int. Cl.
   *A47J 37/12*        (2006.01)
(52) U.S. Cl.
   CPC ....... *A47J 37/1266* (2013.01); *A47J 37/1233* (2013.01)
(58) Field of Classification Search
   CPC .... A47J 37/1266; A47J 37/1233; A47J 36/06; A47J 27/004; A47J 27/0802; A47J 27/09; A47J 37/0641; A47J 43/044; A47J 2043/0449; A47J 27/00; A47J 27/08; A47J 27/092; A47J 36/025; A47J 36/08; A47J 36/10; A47J 36/12; A47J 36/18; A47J 36/20; A47J 36/22; A47J 37/00; A47J 37/12; A47J 37/1204; A47J 37/1209; A47J 37/1214; A47J 537/1219; A47J 537/1266; A47J 37/1285; A47J 37/129; A47J 37/1295

(Continued)

(56) References Cited

U.S. PATENT DOCUMENTS

| 3,839,951 A | 10/1974 | Palmason |
| 4,590,361 A | 5/1986 | Del Fabbro |

(Continued)

FOREIGN PATENT DOCUMENTS

GB          1111677 A       5/1968

OTHER PUBLICATIONS

IT Search Report issued Mar. 3, 2022 re: Application No. 202100015029, pp. 1-9, citing: GB 1 111 677 A, US 4 590 361 A, US 3 839 951 A and US 2009/0309619 A1.

*Primary Examiner* — Phuong T Nguyen
(74) *Attorney, Agent, or Firm* — CANTOR COLBURN LLP

(57) ABSTRACT

A fryer includes
   a frying tank adapted to contain a cooking liquid;
   a pump adapted to suck from the frying tank, by suction duct, a portion of the cooking liquid and adapted to discharge into the frying tank, by a discharge duct, the portion of the cooking liquid.
The fryer also includes a heater associated with the suction duct and/or the discharge duct and adapted to heat the cooking liquid flowing through the suction duct and/or through the discharge duct, the cooking liquid being heated only by the heater; and
at least one mixer associated with the suction duct and/or discharge duct and adapted to mix cooking liquid flowing through the suction duct and/or discharge duct. The mixer is placed immediately upstream or downstream, or in correspondence with the heater to improve the heat exchange of the cooking liquid with the heater.

10 Claims, 3 Drawing Sheets

(58) Field of Classification Search
USPC ....... 219/432, 433, 436, 438, 442, 472, 474,
219/524, 525, 521; 99/348, 353, 372,
99/376, 324, 325, 330–343, 369,
99/400–418, 422, 425, 426, 430, 440,
99/444, 447, 448, 449, 451, 483, 495,
99/501
See application file for complete search history.

(56) References Cited

U.S. PATENT DOCUMENTS

| | | | | |
|---|---|---|---|---|
| 5,957,037 | A * | 9/1999 | Paget | A23G 1/18 |
| | | | | 99/348 |
| 2009/0309619 | A1 * | 12/2009 | Behle | A47J 37/1223 |
| | | | | 99/403 |
| 2017/0265683 | A1 * | 9/2017 | Gogel | A47J 37/1266 |

* cited by examiner

FRYER

CROSS-REFERENCE TO RELATED APPLICATIONS

This application is related to and claims the benefit of Italian Patent Application No. 102021000015029, filed on Jun. 9, 2021, the contents of which are herein incorporated by reference in their entirety.

TECHNICAL FIELD

The present disclosure relates to a fryer.

BACKGROUND

As is well known, deep fryers, particularly professional and/or industrial fryers for catering, but also domestic fryers, have a frying tank inside which a cooking liquid, e.g., oil or lard, is present in which the food is fried. The cooking liquid in the tank is generally heated by means of a tube-type heat exchanger placed inside the frying tank in direct contact with the oil. Alternatively, the heater can be placed outside the frying tank, close to the walls of the tank, in order to heat the oil contained therein.

The well-known type of fryers are not without drawbacks, one of which is the difficulty of ensuring that the oil maintains a temperature that is constant over time and homogeneous within the entire volume of oil present in the tank.

In fact, in the known fryers, the oil contained in the frying tank often overheats, in particular locally, in certain areas of the tank, reaching the smoke point and forming splashes and vapours. On the one hand, this significantly impoverishes the quality of the oil, and thus the duration of its use, and on the other hand it also triggers phenomena that endanger the safety of the user.

SUMMARY

The present disclosure provides a fryer that obviates the drawbacks outlined above with reference to the prior art, allowing the heated oil to be maintained at a constant temperature and in a uniform manner.

As part of this task, the present disclosure provides a fryer that also allows the quality of the frying oil to be controlled and protected.

The disclosure provides a fryer that can significantly reduce the power up time of the fryer itself and the time required for the oil to return to its optimum heating temperature between one frying and the next.

The disclosure relates to making a fryer which is capable of giving the greatest assurances of reliability and safety in use.

The disclosure further provides a fryer that is quick and easy to clean and is also economically competitive compared to the prior art.

The aforementioned task as well as the aforementioned advantages and others which will become more apparent hereinafter, are achieved by providing a fryer as recited in claim 1.

Other features are provided in the dependent claims.

BRIEF DESCRIPTION OF THE DRAWINGS

Further features and advantages shall be more apparent from the description of a preferred, but not exclusive, embodiment of a fryer, illustrated merely by way of non-limiting example with the aid of the accompanying drawings, in which.

DETAILED DESCRIPTION OF THE DRAWINGS

Figure 1:
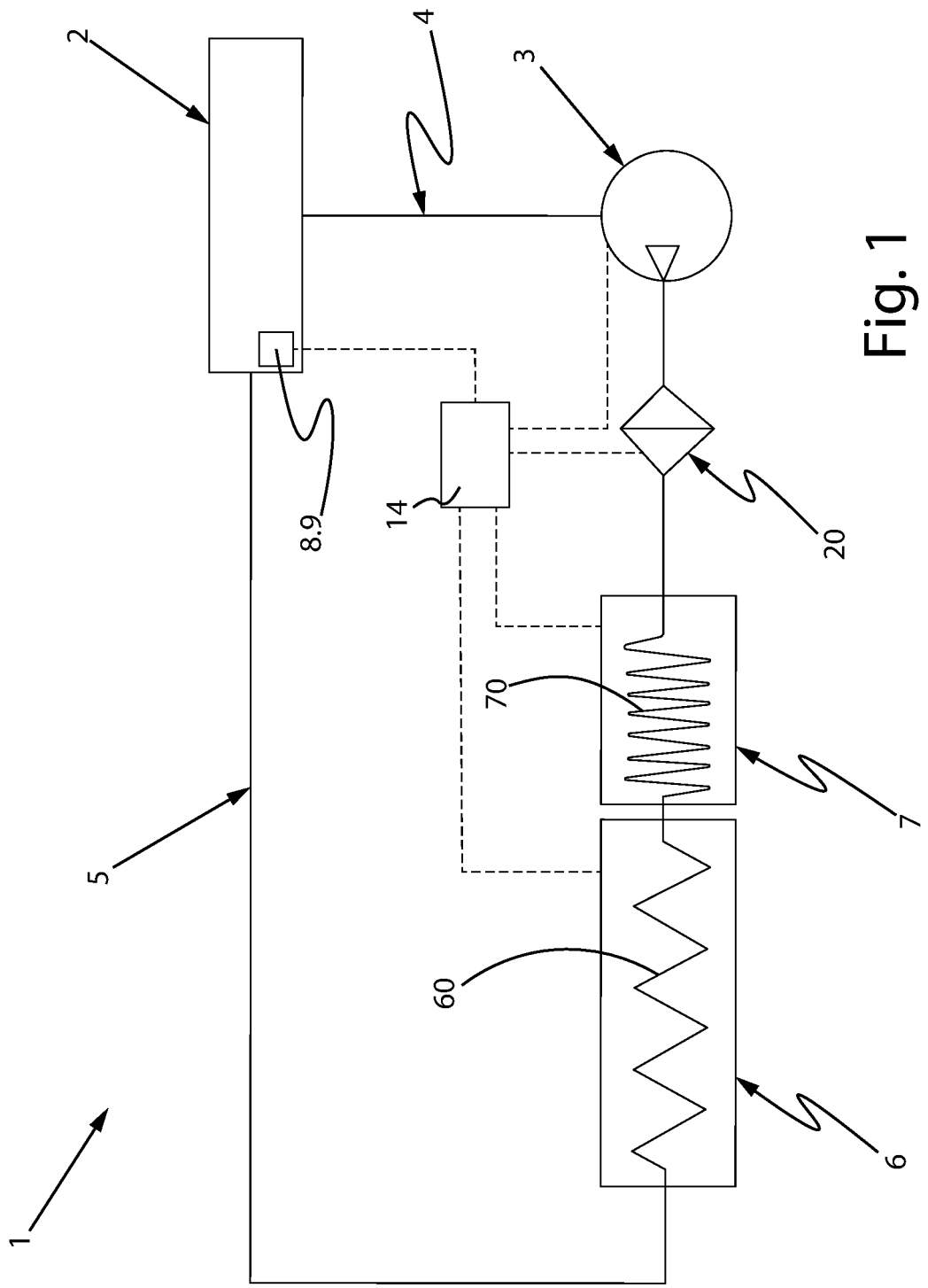
FIG. 1 is a hydraulic diagram of an embodiment of a fryer, according to the disclosure.

With reference to the above-mentioned figures, the fryer, indicated overall by reference number 1, comprises:

a frying tank 2 adapted to contain a cooking liquid;

a pump 3 adapted to suck from the frying tank 2, by means of a suction duct 4, a portion of the cooking liquid and adapted to discharge into the frying tank 2, by means of a discharge duct 5, such a portion of cooking liquid;

at least one heater 6 associated with the suction duct 4 and/or the discharge duct 5 and adapted to heat the cooking liquid flowing through the suction duct 4 and/or through the discharge duct 5, where such cooking liquid is only heated by said at least one heater 6;

at least one mixer 7 associated with the suction duct 4 and/or with the discharge duct 5 and adapted to mix the cooking liquid flowing through the suction duct 4 and/or through the discharge duct 5, where the at least one mixer 7 is placed immediately upstream, or immediately downstream, or in correspondence with the at least one heater 6 to improve the heat exchange of the cooking liquid with the at least one heater 6.

Therefore, the fryer 1 has no heaters located inside the volume of the frying tank 2 in contact with the cooking liquid contained in the frying tank 2 itself, and it also has no heaters located close to the walls of the frying tank 2.

The cooking liquid is only heated in the passage along the suction duct 4 and/or along the discharge duct 5, in correspondence with the area where the heater 6 is located.

This mode of heating the cooking liquid recirculating outside the frying tank 2, in conjunction with the presence of the mixer 7, makes the fryer 1 more efficient, improving the heat exchange and the heating homogeneity of the cooking liquid and thus favouring the maintenance of a desired and optimal temperature of the cooking liquid itself.

In fact, the mixer 7 promotes the heat exchanges within the cooking liquid, between zones at different temperatures thereof.

Preferably, the heater 6 is associated with the discharge duct 5, i.e., placed downstream of the pump 3.

Advantageously, the fryer 1 comprises at least one temperature sensor 8 adapted to detect the temperature of the cooking liquid.

Advantageously, the heater 6 is configured to deliver a quantity of thermal power as a function of the temperature of the cooking liquid detected by the temperature sensor 8. It is thereby possible to control the temperature of the cooking liquid and maintain it, through a feedback control, at a desired constant target value.

Advantageously, the pump 3 is configured to modulate the flow rate of the portion of the cooking liquid flowing along the suction duct 4 and/or along the discharge duct 5 as a function of the temperature of the cooking liquid detected by the temperature sensor 8. Thereby, increasing or decreasing the flow rate of the cooking liquid which passes through the heater 6, the temperature of the cooking liquid can be controlled and maintained, through a feedback control, at a desired constant target value.

Advantageously, the heater 6 and the pump 3 can modulate their operation in coordination with each other, as a function of the temperature of the cooking liquid detected by the temperature sensor 8. This thereby further optimises the efficiency and effectiveness of heating the cooking liquid, while limiting the electrical power absorbed by the fryer 1.

The temperature sensor 8 can be placed inside the frying tank 2, in direct contact with the cooking liquid, or it can be placed against a side wall or the bottom of the frying tank 2, outside the frying tank 2 itself.

Advantageously, there may be a plurality of temperature sensors 8 distributed inside or outside the frying tank 2 at different heights. Thereby, it is also possible to identify any temperature stratifications of the cooking liquid in the frying tank 2 so that the operation of the pump 3, or heater 6, can be intervened in order to reduce said temperature stratification.

Advantageously, the fryer 1 also comprises a quality sensor 9 adapted to detect the quality of the cooking liquid. Thereby, the fryer 1 is capable of signalling when the quality of the cooking liquid falls below the desired standard, and a change of the liquid is required.

Advantageously, the quality sensor 9 is either an electrical capacity and/or electrical conductivity sensor, or an optical type sensor, or a spectrometric sensor.

Thereby, the spoilage of the cooking liquid can be monitored almost in real time.

The quality sensor 9 can be placed in the frying tank 2, or in the suction duct 4 and/or the discharge duct 5.

In addition to returning the colour change and spectrum of the cooking liquid, which are indices of the actual quality of the cooking liquid, the optical or spectrometric-type quality sensor 9 are also capable of identifying the presence of carbon suspensions or products of oxidative degradation, or the presence of heavy metals and the polymerisation of the cooking liquid (e.g., formation of triglycerides, dimers or polymers).

Advantageously, the fryer 1 comprises a control unit 14 in data communication, if any, with the temperature sensor 8, with the quality sensor 9, with the heater 6 and with the pump 3.

Advantageously, the fryer 1 comprises at least one filter 20 for the cooking liquid, which is placed along the suction duct 4 and/or along the discharge duct 5. Such a filter 20 is adapted to filter the cooking liquid that is drawn by the pump 3 in order to remove unwanted residues in the cooking liquid.

Preferably, filter 20 is placed upstream of the heater 6 and/or the mixer 7.

Preferably, the filter 20 is placed downstream of the pump 3, i.e., at a point of the discharge duct 5.

Advantageously, the filter 20 is easily removable, and replaceable, from the fryer 1 and does not require the prior emptying of the frying tank 2 of cooking liquid.

The filter 20 is adapted, through a mechanical action, to extract the frying residues present in the cooking liquid in a continuous or modulated manner.

In fact, advantageously the pump 3 can conveniently pressurise the cooking liquid so as to maximise the filtering capacity and service life of filter 20 itself.

The filter 20 can advantageously be made of durable and/or biodegradable materials.

The filter 20 can be of the self-cleaning type.

Advantageously, the filter 20 can also be cleaned and/or emptied by reversing the flow direction of the cooking liquid, by reversing the direction of rotation of the pump 3.

Furthermore, the filter 20 can be single-stage or multi-stage in order to segment and optimise the filtering capacity.

The filter 20 can be a static type or a dynamic type, e.g., a rotating type.

In the case of a dynamic filter 20, such a filter can be in data communication with the control unit 14, and its operating parameters can be appropriately adjusted via such a control unit 14.

The filter 20 can be of the traditional or self-cleaning type.

Furthermore, the filter 20 can be integrated with the frying tank 2, i.e., it can be associated directly with frying tank 2 itself, e.g., in correspondence with the suction mouth of the suction duct 4, from which the cooking liquid is drawn, or in correspondence with the discharge mouth port of the discharge duct 5, from which the cooking liquid is fed back into the frying tank 2.

Advantageously, the frying tank 2 is configured to be leakproof or semi-leakproof in order to contain the cooking liquid at the end of operations or between operations, so as to minimise the oxidative effects of the cooking liquid during the standby phases of the fryer 1. In other words, the frying tank 2 is also a leakproof or semi-leakproof for the cooking liquid.

Advantageously, the pump 3 is placed at a lower height with respect to the frying tank 2.

Advantageously, the cooking liquid is fed back into the frying tank 2, via the discharge duct 5, at a higher height with respect to the height at which it is drawn in, via the suction duct 4.

Advantageously, furthermore the suction mouth from which the cooking liquid is drawn is located on the opposite side of the frying tank 2 with respect to the discharge mouth from which it is fed back into the tank.

Advantageously, the mixer 7 associated with the suction duct 4 and/or the discharge duct 5 is placed precisely in correspondence with the heater 6, as further explained below.

Advantageously, as illustrated in particular in FIGS. 2 to 7, the heater 6 comprises a plurality of electrical resistances 60 which develop along a longitudinal development direction substantially parallel to the longitudinal development direction of the suction duct 4 and/or the discharge duct 5 to which the heater 6 is associated.

Advantageously, the electrical resistances 60 can be arranged around a longitudinal section of the suction duct 4 and/or the discharge duct 5, according to a radial symmetry distribution.

For example, as illustrated in the accompanying figures, two assemblies of electrical resistances 60 can be included on opposite sides of the suction duct 4 and/or the discharge duct 5 with which said electrical resistances 60 are associated.

Advantageously, the mixer 7 comprises a mixing member 70 placed inside the suction duct 4 and/or the discharge duct 5. Such a mixing member 70 develops along a longitudinal development direction substantially parallel to the longitudinal development direction of the suction duct 4 and/or the discharge duct 5 to which such a mixer 7 is associated.

Advantageously, moreover, the mixing member 70 is at least partially flanked by the electrical resistances 60.

Thereby, the mixing of the cooking liquid operated by the mixing member 70 occurs precisely in correspondence with the heating zone of the liquid itself operated by the electrical resistances 60 of the heater 6, thereby further optimising the heat exchange.

Advantageously, the at least one heater 6 and the at least one mixer 7 together constitute a heating module 10 associated with the suction duct 4 and/or the discharge duct 5 of the fryer 1.

Such a heating module 10 comprises a tubular body 11 which constitutes, in fact, a longitudinal section of the suction duct 4 and/or the discharge duct 5, as a function of where such a heating module 10 is located. The mixer 7 is arranged inside such a tubular body 11.

In other words, for a section of a certain length, the suction duct 4 and/or the discharge duct 5 includes the tubular body 11 of the heating module 10, inside of which the mixer 7 is present.

In fact, the heating module 10 can comprise an inlet mouth 12 for the entering cooking liquid and an outlet mouth 13 for the exiting, heated cooking liquid. Such inlet mouths 12 and outlet mouths 13 are configured to connect respectively to two points of the suction duct 4, and/or the discharge duct 5, as a function of where the heating module 10 is located.

Figure 2:
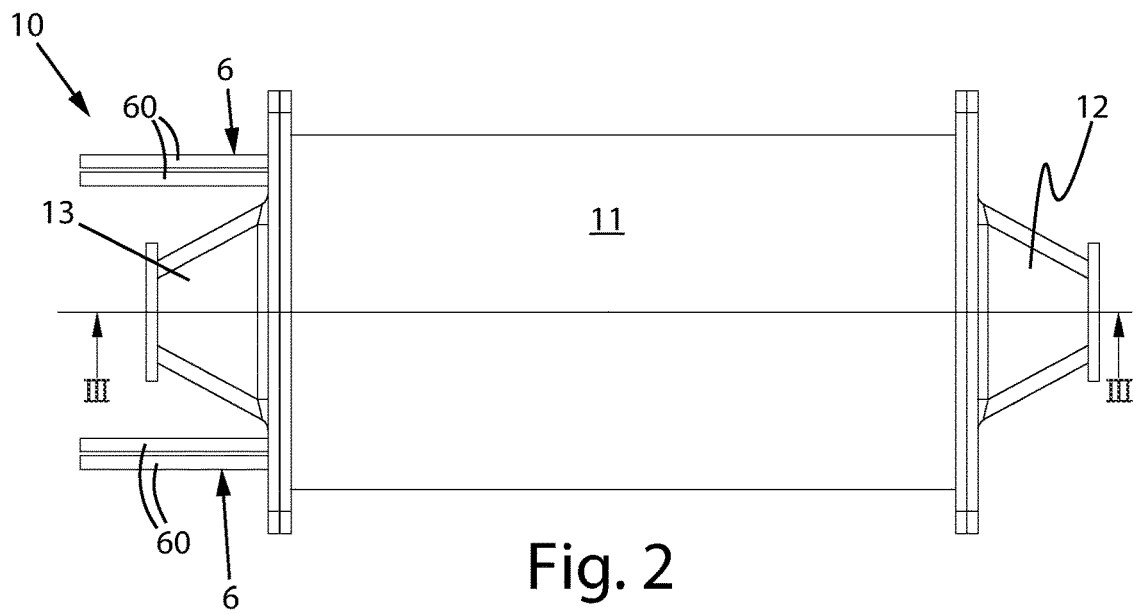
FIG. 2 is a plan view from above of a first variant of a heating module of the fryer according to the disclosure
Figure 3:
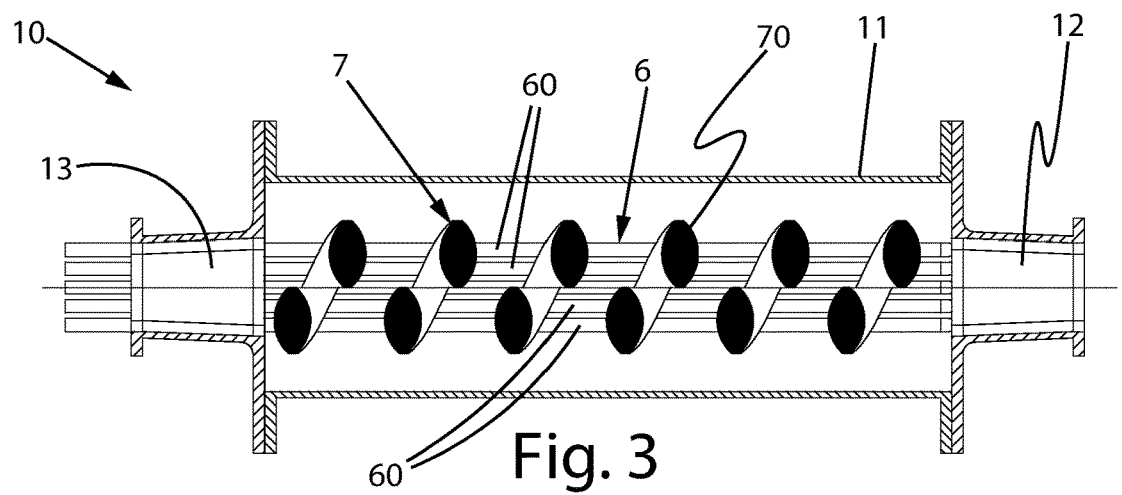
FIG. 3 is a sectional view of the heating module depicted in FIG. 2, performed according to the axis III-III.
Figure 4:
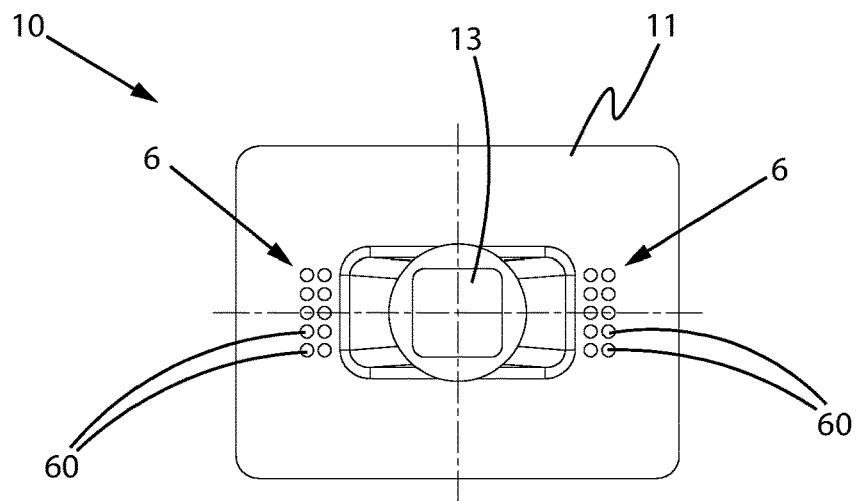
FIG. 4 is a side view of the heating module of FIG. 2.

Advantageously, as illustrated in FIGS. 2 to 4 with reference to the first variant of the heating module 10, the heater 6 comprises a plurality of electrical resistances 60 arranged externally to the tubular body 11, in proximity thereto, and adapted to heat the portion of the cooking liquid flowing along the tubular body 11.

Thereby, the electrical resistances 60 are not placed in direct contact with the cooking liquid.

Figure 5:
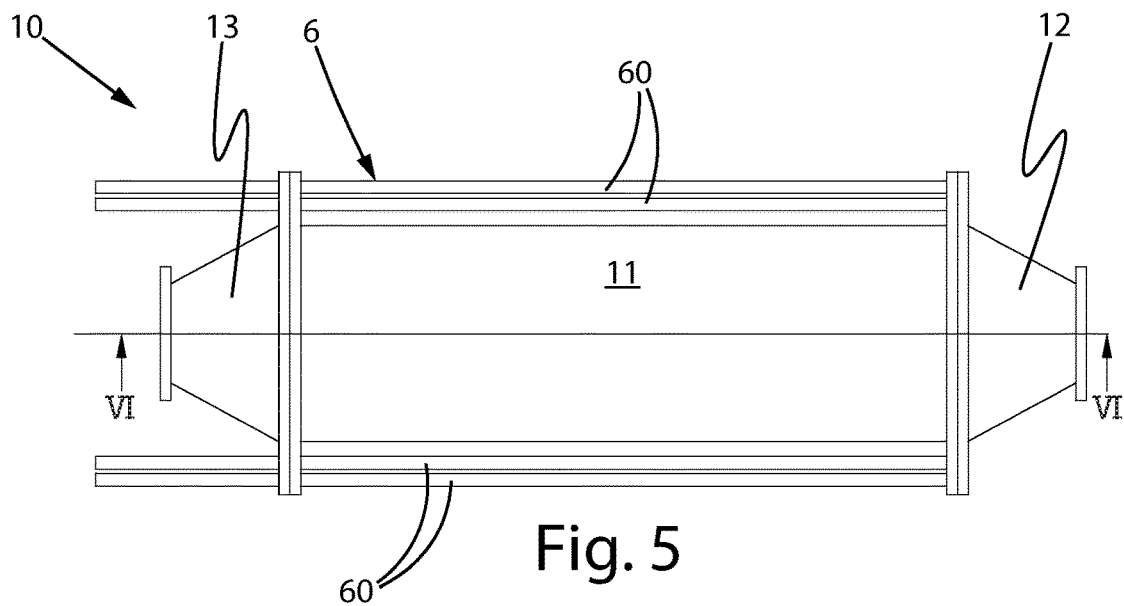
FIG. 5 is a plan view from above of a second variant of a heating module of the fryer according to the disclosure
Figure 6:
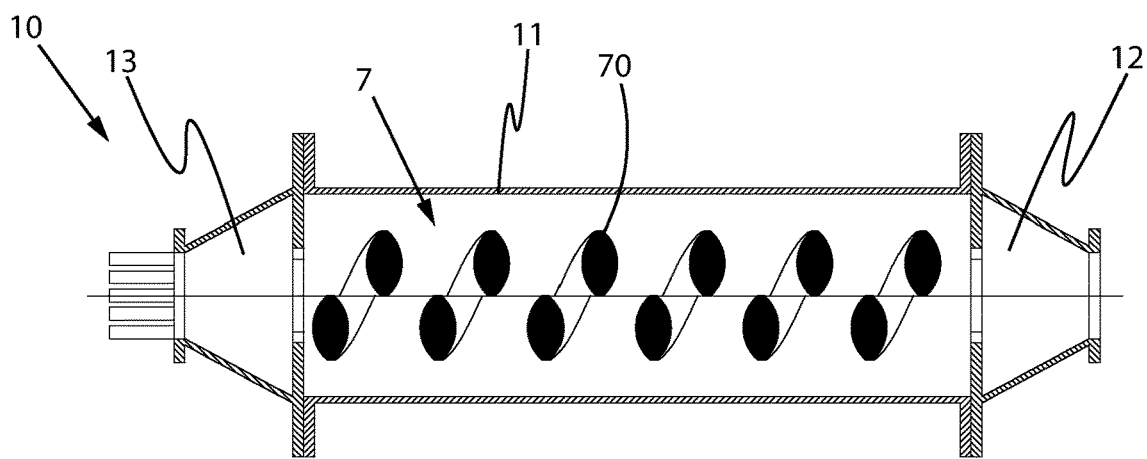
FIG. 6 is a sectional view of the heating module depicted in FIG. 5, performed according to the axis VI-VI.
Figure 7:
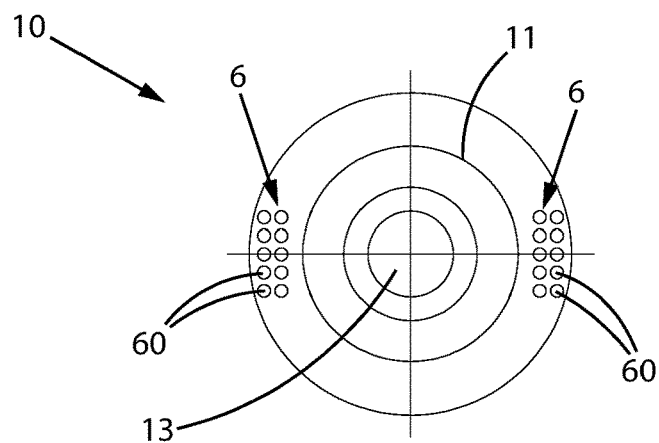
FIG. 7 is a side view of the heating module of FIG. 5.

Alternatively, as illustrated in FIGS. 5 to 7 with reference to the second variant of the heating module 10, the heater 6 comprises a plurality of electrical resistances 60 arranged inside the tubular body 11 and adapted to heat the portion of the cooking liquid flowing along the tubular body 11.

Thereby, the heating elements 60 are placed in direct contact with the cooking liquid, further promoting the heat exchange.

The mixing member 70 can be of the static type, or of the dynamic type, i.e., it can be associated with actuating means which operate the movement therein.

Advantageously, if the mixing member 70 is of the dynamic type, it is in data communication with the control unit 14, so that the actuation thereof can be adjusted on the basis of data from the temperature sensor 8 and/or the quality sensor 9, also as a function of the operating parameters of the heater 6 and/or the pump 3.

Advantageously, the mixing member 70 is a so-called turbulator.

Such a turbulator can be of the disc type, or spring type, or helix type, or spiral type, with a substantially circular or polygonal cross-section.

The mixing member 70 can also include a combination of two or more turbulators of different types.

The tubular body 11 can have a substantially circular cross-section or a polygonal cross-section, e.g., rectangular. The shape of the cross-section of the tubular body 11 can depend on the configuration of the mixing member 70 present therein, the configuration of the electrical resistances 60, as well as whether the electrical resistances 60 are also located inside the tubular body 11 or outside.

Advantageously, the heating elements 60 can be associated with the outer surface of the mixing member 70.

Advantageously, the heating elements 60 can be inside the mixing member 70 itself.

Advantageously, the heating elements 60 and the mixing member 70 can form a single component for heating and mixing the cooking liquid.

Advantageously, the heating module 10 can comprise a plurality of tubular bodies 11, flanked side by side, each having its own internal mixing member 70. The electrical resistances 60 can be distributed within each of such tubular bodies 11, or they can be distributed externally thereto, between contiguous tubular bodies 11.

The functioning of the fryer is clear and obvious from what has been described.

Specifically, the oil is mixed and heated, as well as filtered, externally to the frying tank 2, in an external recirculation circuit governed by pump 3.

Furthermore, the heater 6 and/or the pump 3 can be controlled in feedback as a function of the actual oil temperature measured in the frying tank 2 by the temperature sensor 8, so as to ensure that desired cooking temperatures are reached and maintained.

Furthermore, by virtue of the presence of the quality sensor 9, when the quality of the oil degrades, the fryer 1 signals the need to change it or supplement it with new oil. When the quality of the oil degrades, the fryer 1 is also capable of optimise the parameters of tank temperature, flow, and, if necessary, fluid filtration, so as to extend the duration of the frying oil, maintain high frying quality, and ensure the overall efficiency of the system.

Furthermore, the sensors 8, 9 in the fryer will allow the operator to suggest or automatically initiate actions to extend the service life of the oil or maintain the fryer 1 itself.

In practice, it has been found that the fryer, according to the present disclosure, fulfils the task as well as the intended objects as it has a significantly improved heating efficiency.

Another advantage of the fryer, according to the disclosure, is that it improves the achievement and maintenance of a desired frying temperature. In particular, the fryer, according to the disclosure, allows to maintain the cooking oil constantly above 160° C. throughout the frying process, improving the quality of the food product obtained and avoiding oil stratification in the tank. In these conditions, in fact, the temperature of 230° C. is never exceeded, as is the case with conventional fryers, and therefore the smoke point of the oil on the exchange surface is not reached either. Furthermore, the ability to avoid exceeding 230° C. improves safety against fire hazards and prevents the formation of oil vapours and splashes.

The fact that the oil remains at a constant temperature also results in a reduction of the time between one frying and the next, thereby increasing the productivity of the fryer itself.

Furthermore, the maintenance of relatively lower temperatures, and in any case the prevention of overheating peaks, increases the oil's duration and thus makes it possible to increase the number of fried meals produced with the same oil.

A further advantage of the fryer, according to the disclosure, is that it allows an easy and optimal cleaning of the tank. The absence of heating coils at the bottom of the tank makes cleaning the tank more convenient and faster by virtue of its simpler geometry and smaller size. With the fryer according to the disclosure, the so-called "cleaning in place" (CIP) process can also be done several times quickly.

Yet another advantage is that the circuit where the oil flows and the pump itself can be drained if necessary through a so-called "reverse" cycle.

Furthermore, the heating time of the oil decreases, by virtue of the increase in thermal efficiency favoured by the presence of the mixer at the same time as the heater, which shortens the waiting time for production power up.

Furthermore, the frying tank, as it does not have to accommodate internal heating means, in contact with the oil, can be smaller and consequently the amount of oil is reduced with respect to a conventional fryer. Also from a dimensional point of view, having a smaller tank means a better compactness.

The maintenance of the fryer, according to the disclosure, is simplified because the filters and the extraction of oil residues can also occur during the cooking process, thus without necessarily having to empty the tank.

Yet another advantage of the fryer, according to the disclosure, is that it allows the use of not only oil, but also lard.

A further advantage of the fryer, according to the disclosure, is that the electrical power used is significantly lower with respect to that of conventional fryers, which, coupled with the lower oil heating times, results in significant energy and thus economic savings.

Furthermore, the oil filtration, being integrated with optimal thermal distribution and fluidic management, favours an increase in the duration of the oil's service life, thus reducing the environmental impact of discarded waste oil and electricity consumption.

Therefore, in addition to improving the quality and wholesomeness of the fried product, the labour costs and consumption of frying liquids are also reduced.

The fryer thus conceived is susceptible to many modifications and variants, all falling within the same inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A fryer comprising:
   a frying tank adapted to contain a cooking liquid and food to be fried;
   a pump adapted to suck from said frying tank, by a suction duct, a portion of said cooking liquid and adapted to discharge into said frying tank, by a discharge duct, said portion of said cooking liquid;
   at least one heater associated with said suction duct or said discharge duct and adapted to heat said cooking liquid flowing through said suction duct or through said discharge duct, said cooking liquid being heated only by said at least one heater;
   at least one mixer associated with said suction duct or said discharge duct and adapted to mix said cooking liquid flowing through said suction duct or through said discharge duct, said at least one mixer being placed immediately upstream, or immediately downstream, or in correspondence with said at least one heater to improve the heat exchange of said cooking liquid with said at least one heater; and
   at least one filter for said cooking liquid, said filter being placed downstream of the pump along said discharge duct at a point of said discharge duct.

2. The fryer, according to claim 1, further comprises at least one temperature sensor adapted to detect the temperature of said cooking liquid, said at least one heater being configured to deliver a quantity of thermal power as a function of said temperature of said cooking liquid detected by said at least one temperature sensor.

3. The fryer, according to claim 1, further comprises at least one temperature sensor adapted to detect the temperature of said cooking liquid, said pump being configured to modulate the flow rate of said cooking liquid which flows through said suction duct or through said discharge duct as a function of said temperature of said cooking liquid detected by said at least one temperature sensor.

4. The fryer, according to claim 1, further comprises an electrical capacity or electrical conductivity sensor or an optical type sensor or a spectrometric sensor, adapted to detect the quality of said cooking liquid.

5. The fryer, according to claim 1, wherein said at least one mixer associated with said suction duct or said discharge duct is placed in correspondence with said at least one heater.

6. The fryer, according to claim 1, wherein said at least one heater comprises a plurality of electrical resistances which develop along a longitudinal development direction parallel to the longitudinal development direction of said suction duct or said discharge duct to which said at least one heater is associated.

7. The fryer, according to claim 6 wherein said at least one mixer comprises a mixing member placed inside said suction duct or said discharge duct, said mixing member develops along a longitudinal development direction parallel to the longitudinal development direction of said suction duct or said discharge duct to which said at least one mixer is associated, said mixing member being arranged alongside said plurality of electric resistances.

8. The fryer, according to claim 1, wherein said at least one heater and said at least one mixer together constitute a heating module associated with said suction duct or said discharge duct, said heating module comprising a tubular body which constitutes a longitudinal section of said suction duct or said discharge duct, said at least one mixer being arranged inside said tubular body.

9. The fryer, according to claim 8, wherein said at least one heater comprises a plurality of electrical resistances arranged externally to said tubular body, in proximity to said tubular body, and adapted to heat said portion of said cooking liquid flowing along said tubular body.

10. The fryer, according to claim 8, wherein said at least one heater comprises a plurality of electrical resistances arranged inside said tubular body and adapted to heat said portion of said liquid cooking which flows along said tubular body.

* * * * *